3,480,674
N-SECONDARY-ALKYL TERTIARY POLY-AMINE COMPOUNDS

Eugene J. Miller, Jr., Wheaton, Ill., and Ago Mais, Trenton, N.J., assignors to Armour Industrial Chemical Company, Chicago, Ill., a corporation of Delaware
No Drawing. Original application Feb. 23, 1965, Ser. No. 434,607. Divided and this application July 1, 1968, Ser. No. 741,346
Int. Cl. C07c 87/18
U.S. Cl. 260—583                    5 Claims

ABSTRACT OF THE DISCLOSURE

Tertiary amine compounds wherein one tertiary nitrogen atom has a secondary-alkyl group attached to it, useful as fuel additives and bactericides.

CROSS-REFERENCE TO RELATED APPLICATION

This is a divisional application from our copending application Ser. No. 434,607, filed Feb. 23, 1965, "N-Secondary-Alkyl Tertiary Amine Compounds" now U.S. Patent No. 3,398,197 issued Aug. 20, 1968.

The N-secondary-alkyl tertiary amine compounds of this invention have special utility as fuel oil additives, synthetic lubricant additives, bactericides, ore flotation agents, catalysts in preparing polymer foams, and are excellent intermediates for further chemical reactions such as, for example, the formation of amine oxides and quaternary ammonium compounds.

Accordingly, an object of this invention is to provide novel tertiary amine compounds which are useful in various chemical technologies.

More specifically, an object of this invention is to provide a novel class of N-secondary-alkyl tertiary amine-compounds having surprisingly valuable physical and chemical properties for many chemical technologies.

Another object of this invention is to provide a novel class of N-secondary alkyl methylated tertiary amine compounds.

The novel tertiary amine compounds of this invention may be described by the formula:

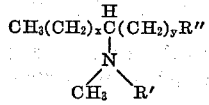

wherein R′ is selected from the group consisting of —CH₃ and

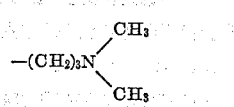

R″ is selected from the group consisting of H and

provided that when R′ is —CH₃, R″ is

and x and y are positive integers having a sum from 2 to about 47.

It has now been found that a new and useful class of N-secondary alkyl tertiary amine compounds may be prepared by alkylating amino substituted secondary-alkyl primary amines and N-secondary-alkyl trimethylene diamine compounds. The amino substituted secondary-alkyl primary amine compounds suitable as reactants to produce the novel compounds of this invention are described in U.S. Patent 3,338,967, issued Aug. 29, 1967, "Process for Preparing Secondary-Alkyl Primary Amines from Olefins." N-secondary-alkyl trimethylene diamine compounds suitable as reactants to produce the novel compounds of this invention are disclosed in co-pending U.S. patent application Ser. No. 422,504, filed Dec. 31, 1964 now U.S. Patent No. 3,398,196 issued Aug. 20, 1968.

The novel tertiary amine compounds of this invention, as illustrated by the above formula, reflect the isomeric nature of the amine reactants used for their preparation. The amine reactants used to prepare the tertiary amine compounds of this invention may be derived from olefinic compounds, in which case the nitrogen atom attached to the secondary-alkyl group may be attached to different interior carbon atoms along a hydrocarbon chain. Isomeric mixtures of various secondary-alkyl amines may be used to form the novel N-secondary-alkyl tertiary amine compounds of this invention. Of particular importance as reactants in the preparation of compounds of this invention are secondary-alkyl amine compounds derived from alpha-olefins. Further, the secondary-alkyl amine reactants used to form the novel tertiary amine compounds of this invention may consist of a mixture of different hydrocarbon chain lengths, usually extending over a range from 2 to about 6 numerically consecutive chain lengths. The mixture of chain lengths is generally dependent upon the cut of mixed olefins from which the secondary-alkyl amines were derived, and is not critical in the formation of the compounds of this invention.

In a specific embodiment, a preferred subclass of tertiary amine compounds of this invention is prepared by methylating amino substituted secondary-alkyl primary amines and secondary-alkyl trimethylene diamines resulting in novel tertiary amine compounds having the formulae:

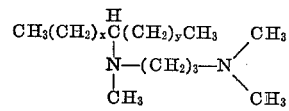

wherein x and y are integers having a sum from 1 to about 20; and

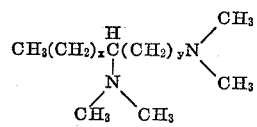

wherein x and y are positive integers having a sum from 2 to about 20. Methylated tertiary amine compounds having the above structures may be produced according to processes well known in the art. For example, the process disclosed in U.S. Patent 3,136,819 may be followed using the reactants described above.

Among radicals comprising secondary-alkyl groups in the above formulae are sec-butyl, sec-pentyl, sec-hexyl, sec-heptyl, sec-octyl, sec-nonyl, sec-decyl, sec-underyl, sec-dodecyl, sec-tridecyl, sec-tetradecyl, sec-pentadecyl, sec-hexadecyl, sec-heptadecyl, sec-octadecyl, sec-nonadecyl, sec-eicosyl, sec-heneicosyl, sec-docosyl, and their terminally substituted nitrogen derivatives.

Specific embodiments of this invention may be illustrated by reference to the following examples:

Example I

A one liter Morton flask equipped with a mechanical stirrer, thermometer, addition funnel, and reflux condenser was charged with 50 gms. (0.174 mole) of 1-amino sec-octadecylamine, 25 gms. of isopropanol, and 25 gms. of water. Formic acid (87.5 gms., 2.09 moles, 88% aqueous solution) was then added to the reaction flask over a 3½ hour period, maintaining the temperature at 25-30° C. The temperature was raised to 65-70° C. and 38.0 gms. (1.39 moles) of 37% formaldehyde was added over a period of one hour. The reaction mixture was maintained at reflux temperature (85° C.) for about 17 hours. The reaction mixture was cooled to about room temperature and the pH of the mixture was raised to 11 by the addition of 50% sodium hydroxide. n-Hexane was added as a solvent for the reaction product and the aqueous layer was removed. The organic phase was then washed with water until the washings were neutral, dried over anhydrous sodium sulfate and stripped in vacuo yielding 53.0 gms. (91.3% mass yield) of N,N,N',N'-tetramethyl 1-amino sec-octadecylamine having the following analysis:

Neutralization equivalent (calc. 170) _____ 201
Primary amine _____percent__ 4.2
Secondary amine _____do____ 7.1
Tertiary amine _____do____ 68.0

Example II

A one liter Parr autoclave was hcarged with 248 gms. (1.5 mole) of N-($C_{7-9}$ secondary-alkyl)-1,3-propylene diamine and 11.2 gms. of nickel formate. The reaction mixture was heated to about 115° C. and hydrogen added to about 300 p.s.i.g. Formcel (a solution of formaldehyde and methanol, 55% active) was then added to the reaction mixture incrementally over a period of about two hours, while maintaining the reaction mixture at a temperature of from about 114 to 118° C. The total Formcel added was 210.4 gms. (4.05 moles). Stirring was continued for about 20 minutes after the addition of Formcel was completed. The crude product was then filtered and residual formaldehyde and solvent removed in vacuo. The crude product, N,N',N'-trimethyl-N-($C_{7-9}$ secondary-alkyl)-1,3-propylene diamine, was obtained as an amber oil in about 88% crude mass yield having the following analysis:

Neutralization equivalent (calc. 114.5) _____ 115
Secondary amine _____meq./gm__ 1.5
Tertiary amine _____percent__ 84.5

Example III

Using the same apparatus and general procedure of Example II, 248 gms. (1.0 mole) of N-($C_{11-14}$ secondary-alkyl)-1,3-propylene diamine and 10.0 gms. of nickel formate were heated to about 126° C., hydrogen added to about 300 p.s.i.g., and Formcel (139.1 gms.—2.71 moles) was added over a period of about 1 hour, while maintaining the reaction mixture at about 126 to 135° C. Stirring was continued for about 10 minutes after the addition of Formcel was completed. The product was recovered as in Example II resulting in an amber oil, about 90% crude mass yield of crude product, N,N',N'-trimethyl-N-($C_{11-14}$ secondary-alkyl)-1,3-propylene diamine, having the following analysis:

Neutralization equivalent (calc. 145) _____ 157
Secondary amine _____meq./gm__ 1.90
Tertiary amine _____percent__ 68.2

Example IV

Using the same apparatus and general procedure of Example II, 346 gms. (1.0 mole) of N-($C_{15-20}$ secondary-alkyl)-1,3-propylene diamine and 13.8 gms. of nickel formate were heated to about 120° C., hydrogen added to about 300 p.s.i.g., and Formcel (139 gms.–2.71 moles) was added over a period of about 1½ hours, while maintaining the reaction mixture at 112 to 122° C. Stirring was continued for about 30 minutes after the addition of Formcel was completed. The product was recovered as in Example II resulting in an amber oil, about 90% crude mass yield of crude product, N,N',N'-trimethyl-N-($C_{15-20}$ secondary-alkyl)-1,3-propylene diamine, having the folowing analysis:

Neutralization equivalent (calc. 194) _____ 198.5
Secondary amine _____meq./gm__ 0.74
Tertiary amine _____percent__ 81.0

We claim:
1. N-secondary-alkyl tertiary amine compounds represented by the formula:

$$CH_3(CH_2)_x\underset{\underset{N(CH_2)_3N(CH_3)_2}{|}}{\overset{H}{C}}(CH_2)_y-R''$$

wherein R'' is selected from the group consisting of H and $$-N(CH_3)_2$$

and $x$ and $y$ are positive integers having a sum from 2 to about 47.

2. N-secondary-alkyl tertiary amine compounds of claim 1 represented by the formula:

$$CH_3(CH_2)_x\underset{\underset{N(CH_3)(CH_2)_3N(CH_3)_2}{|}}{\overset{H}{C}}(CH_2)_yH$$

wherein $x$ and $y$ are positive integers having a sum from 2 to about 20.

3. N-secondary-alkyl tertiary amine compounds of claim 2, wherein $x$ and $y$ are positive integers having a sum from 5 to 7.

4. N-secondary-alkyl tertiary amine compounds of claim 2, wherein $x$ and $y$ are positive integers having a sum from 9 to 12.

5. N-secondary-alkyl tertiary amine compounds of claim 2, wherein $x$ and $y$ are positive integers having a sum from 13 to 18.

References Cited

UNITED STATES PATENTS 3,201,472   8/1965   Spivack.

OTHER REFERENCES

Mannich et al.: Berichte, vol. 68, pp. 273 to 276 (1935).

CHARLES B. PARKER, Primary Examiner

R. L. RAYMOND, Assistant Examiner

U.S. Cl. X.R.

252—50, 51.5, 60; 260—567.6, 584, 999